No. 684,391. Patented Oct. 8, 1901.
S. DE AYOLA.
POROUS CUP.
(Application filed May 1, 1901.)
(No Model.)
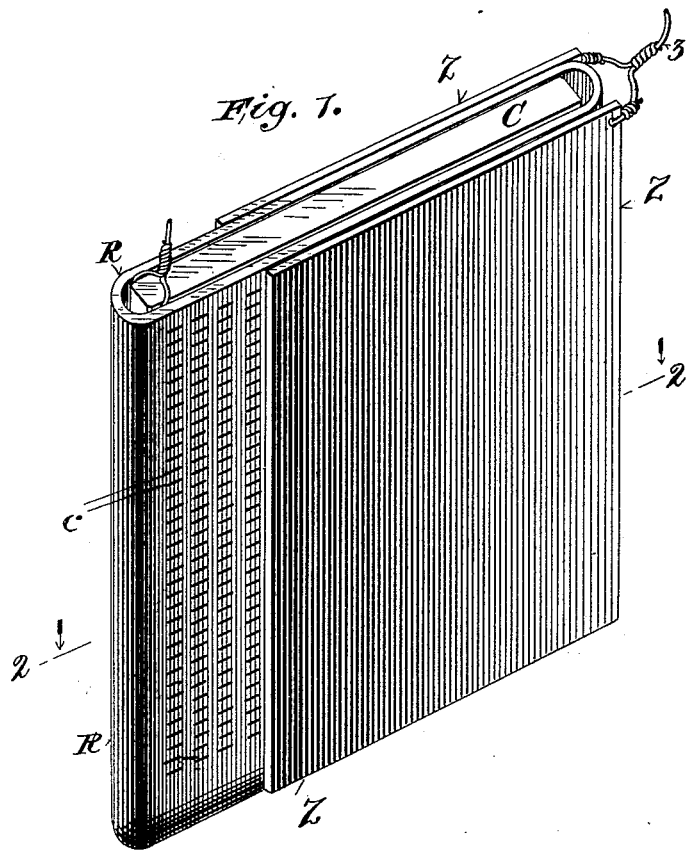
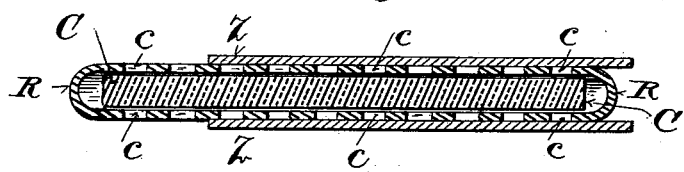
Witnesses;
C. W. Benjamin
John T. Booth
Inventor;
Stephen de Ayola
by
James M. Tully
atty
THE NORRIS PETERS CO., PHOTO-LITHO., WASHINGTON, D. C.

UNITED STATES PATENT OFFICE.

STEPHEN DE AYOLA, OF NEW YORK, N. Y., ASSIGNOR OF ONE-HALF TO GEORGE E. FRITZ, OF SAME PLACE.

POROUS CUP.

SPECIFICATION forming part of Letters Patent No. 684,391, dated October 8, 1901.

Application filed May 1, 1901. Serial No. 58,358. (No model.)

*To all whom it may concern:*

Be it known that I, STEPHEN DE AYOLA, a citizen of the United States, residing in the city of New York, county of New York, and State of New York, have invented a new and useful Improvement in Porous Cups; and I do hereby declare that the following is a full, clear, and exact description of the same.

My invention relates to improvements in porous cups which are used and employed in primary electric batteries; and the object of my invention is to provide a cup which in an electric primary battery will be practically unbreakable and will economize space, minimize weight, and prevent loss and waste of the elements constituting the battery. To attain this object, I employ a rubber cup punctured or perforated with interstices or holes in such manner that when the rubber is at rest or free from pressure or tension the interstices or holes will be closed, and the cup will then be impervious or non-porous, thus preventing the action of the elements constituting the battery, but when the rubber is slightly stretched or drawn or impressed the interstices or punctures will open, acting as pores and giving porosity to the cup, thus permitting action of the elements until the tension is released or pressure withdrawn.

Reference is had to the accompanying drawings, in which similar letters refer to similar parts throughout both views.

Figure 1 is a perspective view of a cup embodying my invention, showing the cup containing a carbon plate and placed between two zinc plates. Fig. 2 is a cross-section on the line 2 2 in Fig. 1.

In the parts of a battery thus illustrated as comprising my invention the cup R consists of a rubber pouch or bag which may be made of one piece or may consist of two or more pieces of rubber cemented together and so as to form a liquid-tight pouch or bag. Being of rubber, the cup is not subject to the action of the acids employed in an electric battery. The rubber is punctured with numerous small interstices or holes $c$ $c$, which are formed by slitting or pricking through the body of the rubber without cutting out any of the tissue, so that owing to the elasticity of the rubber the interstices or holes $c$ $c$ will act as valves, opening and giving porosity to the cup when the rubber is stretched or subjected to tension or pressure and closing tightly when the pressure or tension is removed. The interstices may be circular or elongated or of any shape or form. The rubber should be of such thickness that it will afford sufficient elasticity to open the pores or interstices when tension or pressure is applied and to close the interstices tightly when relaxed by release of the tension or pressure. The rubber may be attached to the cover of the jar or vessel containing the battery, so that by raising or lowering the cover the rubber will be stretched or compressed and the required porosity attained and by releasing the pressure or tension the rubber relaxes and closes the pores. Any mechanical means may be employed to apply tension or pressure to the rubber.

If desired, the rubber may be of such thinness that when relaxed or at rest the perforations will not close tightly, but will remain sufficiently open to permit the action of the acids through the pores at all times. In that case the cup will simply be a flexible indestructible porous cup.

Porous cups heretofore in use in primary electric batteries have been made of firm and brittle substances of considerable bulkiness. Batteries containing such cups are for many purposes, and particularly for use in electric vehicles, inconvenient and impractical for the following reasons: Such cups being necessarily loosely packed in cells, the jarring of the vehicle causes them to knock against the zinc and carbon plates, and the cups, being easily breakable, are frequently broken, thereby destroying the battery. Again, such cups are of such bulkiness that in order to obtain the required ampere charge for high power and long distance it is necessary to have a battery of too great bulk and weight for convenient and practical use in a vehicle. Again, such cups being always porous the action of the elements is constantly at work, decomposing the same and causing waste of the elements and requiring frequent recharging.

By the use of my invention many plates of zinc Z and carbon C may be closely packed together in their individual or multiple cups R, thereby greatly economizing space and lessening the weight for any required ampere charge and at the same time preventing breakage, the cup itself being practically unbreakable, and the rubber acting as a protection to the zinc and carbon. Besides, the rubber being acid-proof and the porosity and non-porosity of the cup being attained as desired by opening or closing the interstices $c\ c$, as above described, the action of the elements can be stopped at any time, thereby saving the elements and preventing waste when the battery is not in use.

The cup may be of any shape or form.

Having thus described my invention, what I claim as new, and desire to secure by Letters Patent, is—

1. In a primary electric battery an elastic cup provided with interstices and means for applying tension to said cup to open and close the interstices according to the tension applied or released.

2. In a primary electric battery the combination with zinc and carbon of an elastic cup, provided with interstices or pores, which will open and close as tension is applied or released, and with means for applying and releasing tension.

In testimony whereof I have hereunto set my hand the 17th day of April, 1901.

STEPHEN DE AYOLA.

In presence of—
JOHN T. BOOTH,
N. T. MINOGUE.